United States Patent
Robinson et al.

(10) Patent No.: US 10,494,721 B1
(45) Date of Patent: Dec. 3, 2019

(54) ELECTROLESS DEPOSITION OF METAL ON 3D-PRINTED POLYMERIC STRUCTURES

(71) Applicant: National Technology & Engineering Solutions of Sandia, LLC, Albuquerque, NM (US)

(72) Inventors: David Robinson, Hayward, CA (US); Christopher G. Jones, San Jose, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 57 days.

(21) Appl. No.: 15/671,345

(22) Filed: Aug. 8, 2017

(51) Int. Cl.
*C23C 18/31* (2006.01)
*C23C 18/16* (2006.01)
*B33Y 10/00* (2015.01)
*B33Y 80/00* (2015.01)

(52) U.S. Cl.
CPC .............. *C23C 18/31* (2013.01); *B33Y 10/00* (2014.12); *B33Y 80/00* (2014.12); *C23C 18/1641* (2013.01); *C23C 18/1648* (2013.01)

(58) Field of Classification Search
CPC ...... C23C 18/16; C23C 18/31; C23C 18/1641
See application file for complete search history.

(56) References Cited

U.S. PATENT DOCUMENTS

| | | | | |
|---|---|---|---|---|
| 5,925,415 A | * | 7/1999 | Fry | C23C 18/1893 427/304 |
| 6,824,665 B2 | * | 11/2004 | Shelnut | C23C 18/1671 205/102 |
| 2005/0208774 A1 | * | 9/2005 | Fukunaga | C23C 18/1619 438/745 |
| 2016/0168715 A1 | | 6/2016 | Ma et al. | |

FOREIGN PATENT DOCUMENTS

WO   WO-2016058091 A1 *   4/2016   ............. A43B 7/141

OTHER PUBLICATIONS

Bernasconi, Electroless plating of NiP and Cu on polylactic acid and polyethylene terephthalate glycol modified for 3D printed flexible substrate, Jul. 2016, Journal of the electrochemical society, 163 (9),p. D526-531 (Year: 2016).*

Zheng, Multiscale metallic metameterials, 2016, Nat Mater, 15(10) p. 1100-1106 (Year: 2016).*

(Continued)

*Primary Examiner* — Dah-Wei D. Yuan
*Assistant Examiner* — Nga Leung V Law
(74) *Attorney, Agent, or Firm* — Medley, Behrens & Lewis, LLC

(57) ABSTRACT

A process for metallizing a three-dimensional-printed polymeric structure includes soaking the three-dimensional-printed polymeric structure in a metal salt solution; transferring the three-dimensional polymeric structure to a solution comprising a first reducing agent; soaking the three-dimensional polymeric structure in a metal plating bath, the metal plating bath comprising a coordinating agent, a palladium or platinum salt, a pH buffer component, and a second reducing agent, to form a metal plated polymeric structure. A metal plated porous structure and an apparatus for improving metallization are also disclosed.

16 Claims, 5 Drawing Sheets

(56) References Cited

OTHER PUBLICATIONS

R. Bermasconi, C. Credi, M. Tironi, M. Levi, and L. Magagnin, "Electroless Metallization of Stereolithographic Photocurable Resins for 3D Printing of Functional Microdevices", Journal of the Electrochemical Society, 164 (5), B3059-B3066 (2017).

R. Bermasconi, G. Natale, M. Levi, and L. Magagnin, "Electroless Plating of NiP and Cu on Polylactic Acid and Polyethylene Terephthalate Glycol-Modified for 3D Printed Flexible Substrates", Journal of the Electrochemical Society, 163 (9), D526-D531 (2016).

M. Charbonnier, M. Alami, and M. Romand, "Electroless plating of polymers: XPS study of the initiation mechanisms", Journal of Applied Electrochemistry, 28 (4), 449-453 (1998).

Charbonnier, et al., "Polymer Pretreatments for Enhanced Adhesion of Metals Deposited by the Electroless Process", In International Journal of Adhesion and Adhesives, vol. 23, Mar. 13, 2003, pp. 277-285.

Dogan, et al., "Effects of Process Parameters on the Synthesis of Palladium Membranes", In Nuclear Instruments and Methods in Physics Research B, vol. 266, May 22, 2008, pp. 3458-3466.

Equbal, et al., "Investigations on Metallization in FDM Build ABS Part Using Electroless Deposition Method", In Journal of Manufacturing Processes, vol. 19, 2015, pp. 22-31.

Farrer, et al., "Selective Functionalization of 3-D Polymer Microstructures", In Journal of American Chemical Society, vol. 128, Jan. 24, 2006, pp. 1796-1797.

Garcia, et al., "3D Amino-Induced Electroless Plating: A Powerful Toolset for Localized Metallization on Polymer Substrates", In ChemPhysChem, vol. 12, 2011, pp. 2973-2978.

Gui-Xiang, et al., "Process of Direct Copper Plating on ABS Plastics", In Applied Surface Science, vol. 253, Jan. 24, 2006, pp. 480-484.

Javaid, et al., "Efficient and Continuous Decomposition of Hydrogen Peroxide Using a Silica Capillary Coated with a Thin Palladium or Platinum Layer", In Bulletin of the Chemical Society of Japan, vol. 88, Apr. 13, 2015, pp. 976-980.

Kim, et al., "Palladium-Catalyzed Electroless Plating of Gold on Latex Particle Surfaces", In Journal of Applied Polymer Science, vol. 112, Jan. 23, 2009, pp. 843-849.

Muench, et al., "Electrodeposition and Electroless Plating of Hierarchical Metal Superstructures Composed of 1D Nano- and Microscale Building Blocks", In Electrochimica Acta, vol. 202, 2016, pp. 47-54.

Nicolas-Debarnot, et al., "Influence of the Polymer Pre-Treatment Before Its Electroless Metallization", In Surface and Coatings Technology, vol. 200, 2006, pp. 4257-4265.

Ohno, Izumi, "Electroless Deposition of Palladium and Platinum", In Modern Electroplating, Fifth Edition, 2010, pp. 477-482.

Olivera, et al., "Plating on Acrylonitrile-Butadiene-Styrene (ABS) Plastic: A Review", In Journal of Materials Science, vol. 51, Jan. 4, 2016, pp. 3657-3674.

S. Y. Park, J. W. Chung, R. D. Priestley, and S.-Y. Kwak, "Covalent assembly of metal nanoparticles on cellulose fabric and its antimicrobial activity", Cellulose, 19 (6), 2141-2151 (2012).

Rhoda, R.N., "Barrel Plating by Means of Electroless Palladium", In Journal of the Electrochemical Society, Jul. 1961, pp. 707-708.

E. Ruckenstein and L. Hong, "Binding Catalytic Sites to the Surface of Porous Polymers and Some Catalytic Applications", Chemistry of Materials, 4 (1), 122-127 (1992).

S.-K. Ryi, N. Xu, A. Li, C. J. Lim, and J. R. Grace, "Electroless Pd membrane deposition on alumina modified porous Hastelloy substrate with EDTA-free bath", International Journal of Hydrogen Energy, 35 (6), 2328-2335 (2010).

T. A. Schaedler, A. J. Jacobsen, A. Torrents, A. E. Sorensen, J. Lian, J. R. Greer, L. Valdevit, and W. B. Carter, "Ultralight Metallic Microlattices", Science, 334 (6058), 962-965 (2011).

Shacham-Diamand, et al., "30 Years of Electroless Plating for Semiconductor and Polymer Micro-Systems", In Microelectronic Engineering, vol. 132, 2015, pp. 35-45.

Sun, et al., "Dendrimer-Mediated Immobilization of Catalytic Nanoparticles on Flat, Solid Supports", In Langmuir, vol. 18, May 28, 2002, pp. 8231-8236.

Tang, et al., "A Novel Surface Activation Method for Ni/Au Electroless Plating of Acrylonitrile-Butadiene-Styrene", In Surface and Coatings Technology, vol. 206, 2011, pp. 1382-1388.

Vandelinder, et al., "Simple, Benign, Aqueous-Based Amination of Polycarbonate Surfaces", In Applied Materials and Interfaces, vol. 7, 2015, pp. 5643-5649.

X. Zheng, W. Smith, J. Jackson, B. Moran, H. Cui, D. Chen, J. Ye, N. Fang, N. Rodriguez, T. Weisgraber, and C. M. Spadaccini, "Multiscale metallic metamaterials", Nat Mater, 15 (10), 1100-1106 (2016).

Chen, et al., "Route to Three-Dimensional Metallized Microstructures Using Cross-Linkable Epoxide SU-8", In Chemistry of Materials, vol. 19, No. 16, 2007, pp. 3858-3860.

Chen, et al., "Supporting Information for: Route to Three-Dimensional Metallized Microstructures Using Cross-Linkable Epoxide SU-8", 1 page.

Takeyasu, et al., "Fabrication of 3D Metal/Polymer Microstructures by Site-Selective Metal Coating", In Applied Physics A, vol. 90, No. 2, 2008, pp. 205-209.

\* cited by examiner

ELECTROLESS DEPOSITION OF METAL ON 3D-PRINTED POLYMERIC STRUCTURES

STATEMENT OF GOVERNMENTAL INTEREST

This invention was made with Government support under Contract No. DE-NA0003525 awarded by the United States Department of Energy/National Nuclear Security Administration. The U.S. Government has certain rights in this invention.

FIELD

This disclosure relates to precision metal-coating of finely detailed polymeric structures, such as can be made by 3D printing.

BACKGROUND

Over the past several years there have been rapid improvements in hardware and software technologies for 3D printing, known more generally as additive manufacturing. This has led to a wide range of applications in both industry and research where parts can be designed and printed as needed. The use of 3D printing provides several benefits in comparison to traditional manufacturing methods, most notably greater design freedom, allowing the fabrication of complex architectures previously unattainable through standard machining. This allows for computationally optimized designs in which parts can be enhanced to achieve lower densities as well as unique mechanical and structural properties. The declining cost and greater accessibility of 3D printing technology has tremendous potential for future development toward novel functional materials Direct metal 3D printing has become a popular manufacturing technique for rapidly fabricating parts that require the structural, thermal, or electrical functionality of a metal. While useful in many applications, the selective laser melting (SLM) process by which metal structures are formed has several inherent limitations. SLM relies on the melting of metal powder beds composed of dispersed particles with diameters typically in the tens of μm. The localized melting process is very complex, involving large temperature gradients. Spatial resolution in these systems is limited by a combination of particle size and heat transport mechanisms, making the reliable printing of sub-millimeter features very difficult. Also, the process can generate voids, impurities, and other defects that compromise the properties of small scale features. Additionally, the relatively high cost of printing precious metals such as platinum, palladium, or gold may be prohibitive for applications where only surface functionality is needed.

In contrast to metal 3D printing, polymer printing techniques such as automatic extruding (e.g., fused-deposition modeling (FDM)) and stereolithography (SLA) have reliably achieved smaller feature sizes. Lower material cost in comparison to metal printing also makes these technologies an attractive alternative. However, without the functional properties of a metal, the utility of these parts is often restricted to a narrow range of applications.

Metallization of plastic surfaces can be aided by the initial step of plasma treatment on planar samples, but plasmas cannot uniformly react with finely detailed 3D-printed structures such as dense lattices. Strong chemical oxidants such as chromic acid can be used to assist in a chemical plating process but these can have adverse environmental consequences and are still not sufficient to adequately coat dense lattices.

SUMMARY

Technology described herein to metallize dense lattices or precision detailed three-dimensional architectures opens several possibilities towards developing unique multifunctional materials. This technology stands in contrast to other processes where polymer substrates were etched away leaving behind rigid metal lattices. These were very sparse lattices that are easier to coat than denser lattices due to spatial constraints. Denser lattices also more easily deplete reactants from the solution. These solutions also used commercial proprietary electroless nickel deposition methods that contain phosphorus as a film impurity.

A process for metallizing a three-dimensional-printed polymeric structure includes soaking the three-dimensional-printed polymeric structure in a metal salt solution; transferring the three-dimensional polymeric structure to a solution comprising a first reducing agent; soaking the three-dimensional polymeric structure in a metal plating bath, the metal plating bath comprising a coordinating agent, a palladium or platinum salt, a pH buffer component, and a second reducing agent, to form a metal plated polymeric structure.

A metal coated polymeric three-dimensional-printed structure includes a porous, three-dimensional-printed polymeric lattice structure having three-dimensions of at least 1 mm. The surface area of the porous, three-dimensional-printed polymeric lattice structure is at least 97% coated with metal. The porous, three-dimensional-printed structure also has a solid volume fraction of 20% or greater, and an average pore size of 5 to 1000 micrometers.

An apparatus for improving convection of reaction fluid through a porous, three-dimensional-printed structure includes a pump, a reaction column configured to receive the porous, three-dimensional-printed structure, and a solution reservoir including a reaction solution. The solution reservoir is coupled to the pump and the reaction column, and the pump being configured to exert pressure or vacuum on the reaction solution, forcing the reaction solution into the reaction column and through the porous, three-dimensional-printed structure.

The above description presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
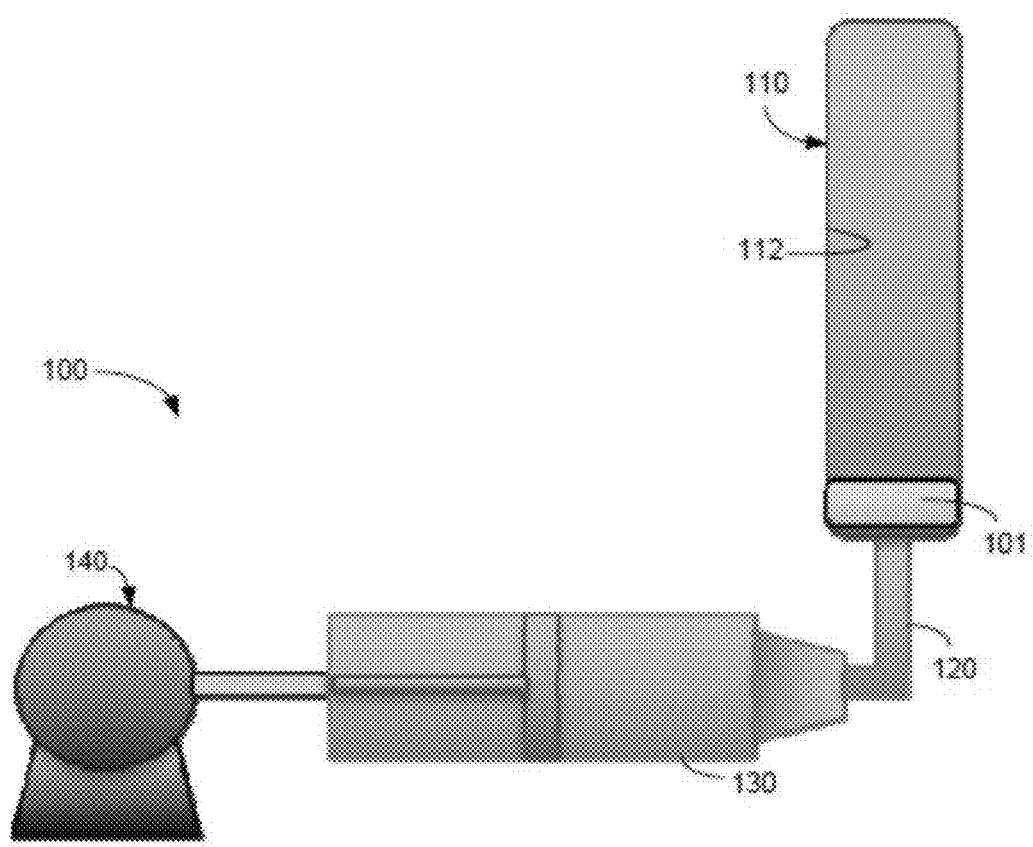
FIG. 1 is a diagram of an example apparatus for pumping reaction solution through an example substrate.

Disclosed herein is a process and materials to metallize dense lattices or precision detailed three-dimensional architectures to provide a metal-coated, polymeric, 3D printed composition with very high uniformity and coverage. An electroless deposition method is utilized with environmentally sound materials to deposit metal on the surface of a non-conducting substrate through a chemical reaction. Using this technique, it is possible to combine the high spatial resolution that 3D polymeric printers are capable of with the functional properties of a metal surface.

The methods and materials disclosed herein provide a reliable method for selectively depositing metals, such as Pd, on the surface of polymers commonly used in 3D printing and manufacturing. Pd itself is a highly catalytic metal and easily forms a metal hydride. However, there are relatively few literature procedures that discuss electroless Pd deposition in comparison to other materials such as copper and nickel phosphorus. The generalized method provided herein allows Pd to be selectively deposited on a range of polymers under ambient conditions using minimal equipment. The general applicability of this method helps eliminate the time-consuming process of developing substrate specific chemistries in order to achieve metallization. Furthermore, this method does not rely on harsh chemical treatments commonly employed in many electroless plating processes.

The technology described herein also addresses the particular problems of dense lattices with very small pores or detailed features. As feature size shrinks to the microscale, especially in 3D-printed lattices, otherwise negligible physical effects such as hydrophobicity become increasingly powerful, severely limiting the reactants' ability to be transported through the structure. To address this in the process described herein a process was developed and tested on substrates composed of logpile and cubic lattices as a proof of concept for developing complex 3D metallic structures. Lattices printed with both FDM and SLA techniques were examined and assessed for their ability to form uniform cohesive films throughout the external and internal surfaces of the substrate. The ability to metallize substrates composed of such complex microscale features opens the way for further development of deterministically fabricated, optimized chemical and mechanical engineering devices that take advantage of the geometries that can be fabricated by 3D printing methods.

The deposition process disclosed herein works selectively on substrate surfaces (as opposed to container surfaces or on homogeneously nucleated particles) through an initial activation process where surface-stabilized nanoparticles act as catalytic sites. The deposition process can be performed under ambient conditions using relatively low-cost equipment. Metal films formed on different polymers have varying degrees of brightness, adhesion strength and plating rates. Polycarbonate substrates showed the fastest plating rate and strongest film adhesion. When FDM printing was used to form more complex substrate architectures, polycarbonate logpiles with 3D microporous structures exhibited strong hydrophobic and reagent transport effects, inhibiting full metallization of printed structures. It was found that using a water-soluble organic cosolvent, and pressure driven flow was sufficient to overcome these limitations and achieve full metallization inside 3D printed microstructures. Microscale lattice architectures formed using SLA with photopolymer resins were also tested. It was found that lattices with pore sizes in the range of 150 µm could be successfully metallized under mild stirring. Through pressure assisted techniques and photopolymeric printing, lattices with pore sizes in the range 8 µm could be successfully metallized. These results show that high-spatial resolution 3D metal-polymer composite parts can be fabricated easily and effectively though a combination of 3D printing and an environmentally friendly electroless deposition process.

In an embodiment, the process for making the metallized polymeric structure is a multistep process including: (1) printing or providing a polymeric structure; (2) soaking the three-dimensional polymeric structure in a metal salt solution to bind the metal on the surface of the polymer; (3) transferring the three-dimensional polymeric structure to a solution comprising reducing agent, which is used to initiate formation of nanoscale seed particles that create catalytically activated surface sites on the polymer; and (4) soaking the three-dimensional polymeric structure in a metal plating bath, the metal plating bath comprising a source of metal ions along with a coordinating agent, pH buffer components, and a reducing agent. A palladium or platinum salt, ammonia, ammonium chloride, and hydrazine were determined to be particularly effective to form a metal plated polymeric structure. Using excess ammonium hydroxide stabilizes the Pd ions in the presence of hydrazine. This method has been shown to prevent bulk precipitation in solution while localizing metal deposition to the substrate surface.

In printing the polymeric structure, a variety of three-dimensional printers can be used, so long as they are capable of printing with polymers, particularly with polymeric filaments or polymeric photosensitive depositions. In an embodiment, the three-dimensional printer is capable of high resolution printing, such as printing lattices with micrometer-scale pores, such as 5 to 1000 micrometers, 75 to 150 micrometers, or 250 to 450 micrometers. Particular examples include robotic extruders such as the FDM type STRATASYS FORTUS 400 printer (an automatic extruding apparatus), or the stereolithographic Autodesk Ember 3D printer.

General the process described herein can be effective at least to some extent with any polymer that can be three-dimensionally printed. In an embodiment, the polymer used for the 3D printed structure is selected from the group consisting of: polycarbonate, polymers comprising acrylic acid or acrylate ester containing monomer, urethane polymers, epoxy-based photoresist polymers, and polymers that include acrylate monomers, such as acrylonitrile butadiene styrene copolymer (ABS), acrylonitrile-styrene-acrylate copolymer (ASA), and poly(methyl methacrylate) (PMMA), and selectively soluble or hydrolyzable polymers. Selectively soluble or hydrolyzable polymers include, for example, poly[oligo(ethylene glycol) diacrylate], poly(lactic acid), poly(glycolic acid), copolymers of lactic and glycolic acids, poly(ethyl acrylate), poly(2-ethylhexyl acrylate), poly (hydroxyethyl methacrylate), poly(butyl acrylate), poly(butyl methacrylate), and poly (trimethylolpropane triacrylate). Epoxy-based photo-resist polymers may include for example novolac resins or SU-8, such as are used in photopattern printing. The polymers should be oxidizable but stable in the plating bath of the process, thus certain functional polymers that are reactive and break down or become unstable with the reagents disclosed herein should be avoided. Common thermoplastic polymers including PC, PMMA, ASA and ABS were tested in the Examples disclosed herein in order to make the deposition procedure as generalized as possible, and potentially adaptable to other desired substrates.

Generally, polymers utilized for the process and structures described herein may have a number average molecular weight (Mn) of 50,000 g/mol to 1,000,000 g/mol, such as, for example, 100,000 to 700,000, or 200,000 to 450,000 g/mol. Polydispersity (Mw/Mn) may be, for example, 1.1. to 5, such as 1.3 to 3, or 1.4 to 2. The polymers may have, for example, a glass transition temperature (Tg) of −100 C to 250 C, such as 0 C to 200 C, or 50 C to 125 C.

The polymeric resins used for printing may include additives as well, such as one or more UV blockers and one or more photoinitiators.

After the three-dimensional polymeric structure is obtained it is then soaked in a metal salt solution. The process disclosed herein does not require an activation step such as $SnCl_2$ or plasma treatments, but rather relies on the ability of the ions in the metal salt solution to be bound to polymer surface functional groups, possibly created by oxidation of the surface by the ion itself.

This soaking procedure should last at least long enough for the solution to fully permeate the interstices of the polymeric structure. Agitation, pressure, or vacuum (such as in the apparatus described below) may be applied to urge the solution into the interstices of the polymeric structure. Depending on overall size and pore size of the structure, the dwell time in the solution may last, for example, 0.1 minutes to 24 hours, such as 1 to 120 minutes, or 3 to 10 minutes.

In an embodiment, the metal salt solution is a dilute solution of the metal salt, such as, for example, 0.001 molar to 0.1 molar, 0.005 molar to 0.05 molar, or 0.01 to 0.07 molar metal salt in water. The metal salt may be a metal ionically bonded to a halogen and an alkali or alkaline earth metal, such as, for example, sodium tetrachloropalladate ($Na_2PdCl_4$) or sodium hexachloroplatinate ($Na_2PtCl_6$). In an embodiment, palladium is used as the metal for the nanoparticle deposition from metal salt. In other embodiments, other transition metals may be used as the metal in the metal salt, such as, for example, nickel, copper, gold, silver, rhodium, and or combinations of these or combinations with platinum and/or palladium. The soaking step may be performed at room temperature and pressure. In this step, it is believed that the metal ions dissociate and adsorb onto the polymeric structure surface.

The stabilization of the metal ion (e.g. Pd) on the surface of the substrate could occur through one of several routes. Some possible surface interactions affecting stabilization may be through the coordination of $Pd^{+2}$ ions with polymer functional groups, oxidation of functional groups from reactive Pd species to form new functional groups that can bind ions, or even some combination of these factors.

In some embodiments it is beneficial to also include a water-soluble organic cosolvent in the metal salt solution (water being the other cosolvent), particularly when especially hydrophobic polymers are being coated. The cosolvent improves wettability of the polymer and can swell the polymer to aid adhesion of the metal nanoparticles. The cosolvent may be a polar cosolvent, and may be an alcohol, ketone, such as acetone, or ester, such as ethyl acetate, or a combination of any these. The alcohol may be a monohydric alcohol, such as isopropanol, propanol, methanol, ethanol, butyl alcohol, t-butyl alcohol, or a combination of any these. The cosolvent, may, for example, be present in an amount of up to 50% by volume, such as 1 to 30%, or 5 to 20% by volume based on the total water and cosolvent content.

Optionally, prior to the metal salt soak, a pre-soak in a solution comprising a polyamine, such as a G3 PAMAM (polyamidoamine) dendrimer, may be incorporated. In some embodiments, this may provide functionality on the surface of the polymeric structure and facilitate the metallization process. Alcohol may also be used in this step as disclosed above.

After soaking in the metal salt solution and saturating the material with the metal ion and optionally wicking or drying the sample, the structure is then soaked in an aqueous solution with a surface activation (reducing) agent to reduce the surface bound metal ions and form metal nanoparticles on the surface. These nanoparticles work to provide a catalyst for the subsequent electroless metal deposition step. These nanoparticles may have a particle diameter of 1 to 120 nm, such as 25 to 100 nm, or 2 to 10 nm. The soak may be performed at room temperature and pressure and may last, for example, 0.1 to 300 minutes, such as 1 to 30 minutes, or 3 to 10 minutes.

The reducing agent may be present in a concentration of 0.001 molar to 0.1 molar, 0.005 molar to 0.05 molar, or 0.01 to 0.07 molar reducing agent in water. Generally, the reducing agent is one that will reduce palladium, preferably without a catalyst, in the environment of the bound polymer surface. If the Pd is bound to carboxyl groups, a relatively mild reductant like sodium ascorbate or hydrazine may be used. If the Pd is bound to amine groups, a stronger reducing agent like borohydride is needed. In an embodiment, the reducing agent is borohydride with an alkali or alkaline earth metal compound, such as sodium borohydride ($NaBH_4$). Borohydride derivatives may be used, such as dimethylamine borane and picoline borane. Borohydrides can reduce $Pd^{+2}$ ions to elemental Pd very rapidly in solution. This is desirable, as the rapid nucleation helps the formed NP to remain stabilized on the polymer surface long enough to reach the plating phase. Although boron itself is known to alloy with Pd metal, its use is restricted to the seeding step and thus the degree of impurities which may result from it is negligible in comparison to the overall metal deposited from the subsequent plating step. Any residual boron should be relegated to the seed particles alone and have no noticeable effect on the bulk properties of the metal. Other alkali or alkaline earth metals could be used in place of sodium, but should be selected to be soluble in the solvent. In an embodiment, the following reaction takes place in this step:

$$4Na_2PdCl_4 + NaBH_4 + 3H_2O \rightarrow 4Pd + 9NaCl + 7HCl + H_3BO_3 \quad (I)$$

After soaking in the reducing agent solution, the three-dimensional structure is removed and dabbed, wicked, or otherwise treated to remove excess soaking solution, but without washing or rinsing, which may wash away the metal nanoparticles.

Once catalytic surface sites are formed in the seeding phase, the substrate can be transferred to the plating bath.

In the plating bath step, the structure is placed in an electroless metal plating bath. The plating bath includes a source of metal ions along with a reducing agent, coordinating agent and pH buffer components. The plating bath can be in an aqueous only or water and cosolvent solution. This step may be performed at room temperature and pressure. In an embodiment, the plating reagents were added in the order of pH buffer, metal salt, coordinating agent, and reducing agent to ensure the metal ions were adequately stabilized before the addition of reducing agent. In an embodiment, the non-reducing components are well mixed prior to adding the reducing agent.

The source of metal ions should include a noble metal, such as palladium. This may be added in a salt form, such as such as $Pd(NH_3)_4Cl_2$, which is less reactive in comparison to $Na_2PdCl_4$. For the plating process, incorporating a less reactive form of Pd helps limit nonhomogeneous film growth and unwanted particle nucleation in the solution during the deposition process. Palladium is a highly catalytic noble metal and has many uses in this regard. It has unique hydrogen storage properties with many applications in metal hydride batteries and fuel cells. The procedure described herein should be compatible with electroless deposition of other transition metals that are electrolessly deposited such as nickel, copper, and platinum. In an embodiment, the source of metal ions is present in a concentration of 0.05 to 2 mol/L, such as, for example, 0.1 to 1 mol/L, or 0.3 to 0.8 mol/L The plating solution is more thermodynamically stable than the activation solution in the prior step. The reducing agent should be more mild than what was used in the metal salt solution. A mild reducing agent should be used in the plating bath that reduces palladium or platinum (whichever one or both is used in the metal salt of the plating bath) at a lower rate than the first reducing agent used in the prior surface activation step (e.g., sodium borohydride). In an embodiment, the mild reducing agent is not able to reduce the metal ion in the plating solution in the absence of a catalyst, or must do so only slightly on a timescale of many hours. If the reducing agent is added to the plating solution and the metal precipitates from solution within 1 minute it would not be a mild reducing agent.

For example, hydrazine or other reducing agents can be used in a ratio of 1:1 to 50:1 mols reducing agent to mols metal ion, such as 1:2 to 20:2, or 3:2 to 10:2. Unlike boron, nitrogen does not alloy well with Pd, making hydrazine a preferred reducing agent for bulk film deposition as it is unlikely to form impurities in the deposited metal. Hydrazine also exhibits a favorable reaction rate for uniform deposition of the metal.

The coordinating agent is selected to stabilize and decrease the reactivity of the metal ions. This is to encourage uniform plating on all surfaces of the structure. Ammonia, and other organic amines that result in a soluble metal ion complex, such as methylamine, dimethylamine, sodium glycinate, tris(hydroxymethyl)aminomethane are examples of such a coordinating agent. The coordinating agent should be present in a molar ratio sufficient to fill all the coordination sites on the metal. For Pd, for example, a ratio of metal ion to coordinating agent may be, for example, 1:4 to 1:(the maximum solubility limit of the coordinating agent), such as, for example, 1:6 to 1:20, or 1:8 to 1:12. The addition of $NH_3$ helps act as a complexing agent, reducing the concentration of $Pd^{+2}$ species with less than four $NH_3$ ligands, and preventing hydrazine from immediately reducing the $Pd^{+2}$ in solution. The complexed Pd ions are thus stabilized until reaching a catalytic surface site, at which point they are susceptible to chemical reduction.

The pH buffer components are selected to absorb byproducts and to maintain a constant reaction rate. This also encourages a uniform plating on all surfaces of the structure. In an embodiment an ammonia-based pH buffer component, such as $NH_3/NH_4Cl$ are used to buffer the solution. $NH_3$ and $NH_4Cl$ act to maintain constant reaction conditions in the plating bath. In the absence of a buffer, unfavorable side reactions or changes in reaction rate may occur during the deposition process. In an embodiment using an ammonia or amine in the solution, a pH of 7.5 to 12.5, such as 8 to 12, or 9 to 11 should be maintained. For example, the pH buffer components should be present in an amount sufficient to keep the reaction solution within a margin of 2 pH units of the starting pH, such as plus or minus 1.5, or plus or minus 1 pH units. For example, ammonia can be used in a concentration at least ten times the expected concentration of H±produced in the reaction (for $Pd^{2+}$, this may be twice the $Pd^{2+}$ concentration), and the ammonium chloride should be at least 1 mmol, and may be in a ratio of, for example, 1:2 to 0.001:1 $NH_4Cl$ to $NH_3$, such as 0.1:1 to 0.01:1, or 0.5:1 to 0.05:1. In an embodiment, the reaction proceeds to 75% or greater completion, such as 80% or 85% completion. The average rate of film growth on the substrate may be 0.1 to 1 micrometers per hour, such as 0.2 to 0.8 or 0.3 to 0.7 micrometers per hour.

As can be seen from the reaction of formula II, when Pd is metal ion and hydrazine is the reducing agent, the pH of the solution could quickly become acidic without sufficient buffer. This would hinder the reaction going forward to fully metallate the structure.

$$2Pd^{+2}+N_2H_4 \rightarrow 2Pd+N_2+4H^+ \quad (II)$$

Agitation, pressure, or vacuum may be applied to urge the plating solution into the interstices of the polymeric structure. The plating bath may be performed at room temperature and pressure. Depending on the size, type of polymer, and geometry of the structure being plated, the dwell time in the plating bath may last, for example, 0.01 to 72 hours, such as 0.1 to 36 hours, or 1 to 18 hours. The plating speed, adhesion strength, and film brightness vary depending on the type of polymer being coated. (See Table 2 below.)

The plated structure is then removed and metal plating should be visually evident on the surface of the structure. In an embodiment, the plating has a thickness of 50 nm to 1 micrometer, such as 100 nm to 700 nm, or 150 to 350 nm as determined by electron microscopy.

Other methods of coating detailed polymeric lattices would not even slightly coat the center of the structure, whereas a center-cut cross-section of a sample of the structure coated as disclosed herein shows full metal plating at the center of the structure. In an embodiment, the metal plating coverage may be 90% or greater, such as 95% or greater, or 99% or greater, as determined by a cross-section cut from the middle of structure and examining the middle 5% of the area of the cross-section by optical microscopy, or by nondestructive evaluation such as computed x-ray tomography, which may be performed on a Zeiss Xradia 520 Versa instrument. In an embodiment, the plating is relatively uniform throughout the structure. Uniformity can be determined by measuring a thickness of the plating at the center of the structure and at the outer boundary of the structure. In an embodiment, the difference in plating thickness between the center and the outer section should be 0 to 35%, such as 0 to 20%, or 0 to 5%. In an embodiment, the surface area of the porous polymeric lattice that is coated with metal is 97% to 100% of the total surface of the structure, such as 98% to 99.9%, or 98.5% to 99.5%. Plating coverage can be determined by computed x-ray tomography.

In an embodiment, one or more of the reaction steps is conducted in a specialized apparatus to improve the convection of the reaction fluid through the 3D printed structure. In the apparatus pressure driven flow is used to provide transport of the bulk fluid and reduce dependence on diffusion along the pore length. This is particularly useful to solve the problem of diffusion of the reactants through very small pores such as may be present in a 3D printed lattice and/or with hydrophobic polymers. Stirring, pumped circulation, and other agitation methods can improve the motion of the reactant fluid. However, for very finely detailed structures with long and narrow pores, e.g., as may be formed in a lattice of 1 mm or more, such as 1 cm or more in diameter or thickness, with pore diameters of 50 micrometers or less, such as 5 micrometers or less, additional procedures disclosed herein may be used to obtain coating extending to the center of the structure.

FIG. 1 discloses an example apparatus 100 for improving convection of reaction fluid through a porous structure 101. The apparatus 100 includes a reaction column 110 in which the porous structure 101 is situated at the bottom. Ideally, there is a tight fit, e.g., 0 to 0.1 mm, such as, 0.0001 to 0.01 mm clearance between the interior walls 112 of the reaction column 110 and the porous structure 101. A soft wrapping material such as parafilm or silicone sheet or o-ring around the circumference of the part may also aid the tight fit. The reaction column 110 also contains the reaction solution, such as the plating bath mentioned herein. The reaction column 110 may be open at the top or covered with a small hole.

A conduit 120 couples the reaction column 110 to the solution reservoir 130. The solution reservoir includes the reaction solution, such as the plating bath mentioned herein.

The solution reservoir 130 is coupled to a computer programmable pump 140. The pump 140 is programmed and configured to push and/or pull the reaction solution slowly through the porous structure 101. The pump may be a syringe pump as shown in FIG. 1.

In an embodiment, the porous structure 101 is placed into the reaction column 110 and mechanically secured at the bottom of the reaction column 110, e.g., with a support anchored to the top or the interior walls 112 of the reaction column 110. The reaction solution is pumped into the reaction column 110 from the solution reservoir 130, and then optionally pumped back through the porous structure 101, and repeated as desired. In an embodiment, the pumping through the porous structure 101 is set to continue on a continuous loop for 24 hours cycling through several push and pull cycles.

In an embodiment, the reaction column 110 is initially filled with the reaction solution and the programmable pump 140 draws the solution into the solution reservoir 130 passing it through the porous structure 101. Optionally, the reverse flow is performed through the porous structure as desired.

The flow rate through the conduit 120 and porous structure 101 may be, for example, 0.1 mL/min to 100 mL/min, such as 0.5 to 10 mL/min, or 0.5 to 5 mL/min.

Additional Properties and Exclusions (to specifically distinguish prior art)

The metallized structures disclosed herein may have a variety of dimensions such as 3D printers are capable of printing. In an embodiment, the structure is a 3D lattice of a cubic, global, or cylindrical geometry, with the largest dimension of the structure being 1 mm or greater, such as 5 mm to 1 cm, or 10 mm to 10 cm. These structures may be lattices formed with small pores such as 5 micrometers to 1000 micrometers in diameter, such as 100 to 250 micrometers, or 150 to 200 micrometers. The structure may have a solid volume fraction of 5% or greater, such as 25% to 75%, or 35% to 50% with the pore sizes disclosed above. Even with such high solid volume fractions and small pore sizes, with the process disclosed herein, metal plating can extend to the center of the structure.

In an embodiment, the process is exclusive of plasma deposition techniques and/or strong chemical oxidants such as, for example, chromic acid. In an embodiment, the entire process is performed at moderate temperature and pressure, such as between the freezing point and boiling point of water, or 50 to 100 degrees F., and at about one atmosphere of pressure, such as 0.8 to 1.2 atm, or 0.9 to 1.1 atm.

In an embodiment, once a continuous metallic film has been deposited, conventional electrodeposition can be applied, broadening the range of materials, thicknesses, and microstructures that can be deposited as an additional layer on the surface.

Applications of particular interest that are enabled by the technology described herein include 3D polymer-metal composite structures for battery and electrochemical capacitor design where computational tools can be used to enhance surface area and flow properties, providing superior charging and discharging rates in energy storage and conversion systems.

The ability to create a functional metal surface on high resolution polymer substrates opens the door to further research toward developing low cost, three-dimensional fuel cells, batteries, separators, electrochemical capacitors, catalysts and chemical reactors that rely on the properties of the metal. Medical implants and mechanical engineering applications like aerospace materials can also utilize this technology. Applications may also be found in electromagnetic and meta-materials.

Not all embodiments disclosed herein must possess the characteristics discussed above. Furthermore, the claims are not to be limited by any such characteristics discussed herein unless recited in the claim itself.

The examples disclosed below further describe the technology. The examples also illustrate useful methodology for practicing the technology. The examples do not limit the claims.

EXAMPLES

The following section describes detailed examples of the process for metallizing a polymeric structure.

Materials used in the examples were obtained as follows. PMMA and PC filaments were purchased from Paradigm Optics. Other filaments were obtained from Stratasys. Sodium borohydride ($NaBH_4$), ammonium hydroxide ($NH_4OH$), hydrazine hydrate ($N_2H_4 \cdot xH_2O$, where x is slightly greater than 1), and ammonium chloride ($NH_4Cl$) were purchased from Sigma Aldrich. Sodium tetrachloropalladate ($Na_2PdCl_4$), and tetraamminepalladium(II) chloride ($(NH_4)_2PdCl_4$) were purchased from Alfa Aesar. Deionized (DI) water was 18 MΩ·cm and prepared in the laboratory.

Examples 1-4: Electroless Deposition on Polymer Filaments

Filaments of polycarbonate (PC) (Example 1), acrylonitrile butadiene styrene copolymer (ABS) (Example 2), acrylonitrile-styrene-acrylate copolymer (ASA) (Example 3), and poly(methyl methacrylate) (PMMA) (Example 4) plastic were cut into sections approximately 2 cm in length with a diameter of 2 mm.

The example substrates were placed in a small vial with 1 mL of 25 mM aqueous $Na_2PdCl_4$ and soaked for 5 minutes. Example substrates were then transferred directly to a vial of 1 mL aqueous 0.1 M $NaBH_4$ and soaked for an additional 5 minutes. The example substrates were then transferred directly to premixed 1 mL aqueous plating bath composed of 26 µl, of 0.1 M $NH_4Cl$, 72 µl, of 0.25 M $Pd(NH_3)_4Cl_2$, 333 µl, 28 wt % of $NH_4OH$, and 570 µl, of 0.1 M $N_2H_4$. Reagent concentrations for the Example 1-4 plating solutions are summarized in Table 2.

TABLE 1

| Component | Concentration (mM) |
|---|---|
| $Pd^{2+}$ | 18 |
| Ammonium Chloride | 2.6 |
| Hydrazine | 57 |
| Ammonia | 5500 |

Upon immersion in plating solution, metallization typically began within the first minute. The example substrates were left for 2-3 hours then washed with DI water to remove excess reactants and left to air dry at room temperature.

Characterization of Examples 1-4

Various characteristics for each polymer substrate were assessed to determine their relative affinity towards metallization. Initial polymer testing was conducted on a small filament (Examples 1-4) (or thin wafer for brightness testing shown in Table 2) for each respective substrate composition. Plating affinity was assessed by three main criteria; rate of film formation, uniformity of film, and strength of adhesion. Film formation rate was judged by the time it took a given substrate to become fully coated by metal in the plating bath. Uniformity of plating was determined by visually observing the cohesiveness and brightness of the film over the surface of the substrate. Further characterization using optical microscopy and scanning electron microscopy was also used to determine uniformity of film deposition and thickness. Film adhesion was assessed by using adhesive tape or a fingernail scratch to determine if films could be delaminated.

Among the polymers tested, PC substrates exhibited the fastest plating time, greatest film uniformity, and strongest film adhesion. Upon being transferred from the $NaBH_4$ solution to the plating bath, metal deposition could be observed within 30 seconds. For simple substrate geometries, complete film coverage was typically achieved within 5 minutes. Metallized PC substrates were bright and exhibited a high degree of uniformity both visually and as determined through microscopy. Films were also strongly adhered to the substrate surface and showed no delamination when exposed to moderate scratching or adhesive tape.

As with PC, PMMA substrates also showed relatively fast reaction times with substrates, becoming fully plated within 5 to 10 minutes. Films on PMMA were both bright and uniform as well. However, films deposited on PMMA substrates exhibited the weakest adhesion strength of all substrates tested, easily delaminating under moderate scratching.

Figure 2:
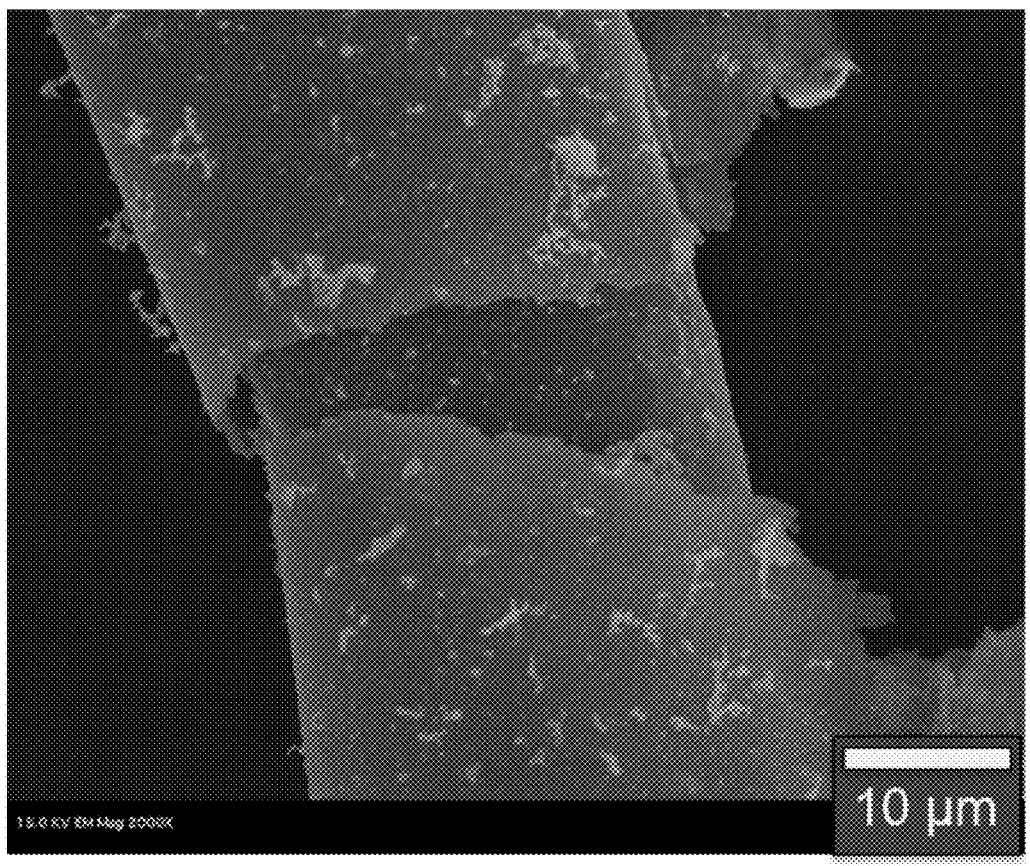
FIG. 2 is a Scanning Electron Microscope (SEM) image of a plated poly(methyl methacrylate) (PMMA) filament.

FIG. 2 shows an SEM image of a partially delaminated PMMA filament after 10 minutes of plating. Based on SEM imaging, a deposited film thickness of 200-300 nm was observed on the surface of the substrate.

To improve film strength on the PMMA substrate, the plating step was iterated several times. After several iterations, metal films began to exhibit slightly improved adhesion strength. However, the strength of adhesion was still relatively low compared to other polymer substrates. For applications where PMMA is desired, additional surface treatments may be necessary to achieve strong film adhesion.

ASA substrates exhibited moderate affinity toward metallization. Films formed on ASA substrates were duller compared to those formed on PC and PMMA. Plating rates for ASA substrates were also slightly slower, typically achieving full metallization between 10-15 minutes. Plated ASA showed comparable adhesion strength to that of PC, with resistance to moderate scratching and adhesive tape. ABS showed similar affinity towards metallization as that of ASA. Films on ABS substrates were dull in color and also resistant to moderate scratching. ABS substrates exhibited similar plating times, between 10-15 minutes.

Although the films achieved through this process may not necessarily possess the same lustrous and adhesive properties as those achieved through more complex plating processes, these results are significant nonetheless as this process provides ability to deposit metal films without using potentially hazardous or toxic chemical oxidizers. This method can therefore act as a way to provide an initial conductive surface for electroplating which offers more precise control over film characteristics.

Table 2 summarizes a qualitative comparison for each polymer type examined. From these observations, difference can be seen in the degree of brightness, adhesion strength and plating rates between different polymer substrate types. As mentioned previously, the likely cause of these differences is due to the way in which Pd ions interact with functional groups during the initial seeding phase.

TABLE 2

| Polymer | Plating Rate | Adhesion Strength | Film Brightness |
|---|---|---|---|
| Polycarbonate | Fast | High | High |
| PMMA | Fast | Low | High |
| ABA | Slow | High | Low |
| ASA | Slow | High | Low |

It was observed that when ABS substrates are either dried or rinsed following the seeding phase, full metallization is not always achieved. This may be because seed particles bind weakly to the ABS surface. In this case, retaining some residual $NaBH_4$ solution on the surface of the substrate plating bath was necessary to achieve optimal metallization.

The plating rate and conversion efficiency of Examples 1-4 was also measured. The rate of formation for metal films differed based on polymer type. PC and PMMA substrates showed the fastest plating rates, forming a fully cohesive metal film throughout the surface of the substrate within 5 minutes. ABS and ASA films showed slightly longer plating times forming cohesive films typically within 10 minutes. Differences in plating time are attributed to the varying affinity of substrate surface sites to stabilize Pd ions during the seeding phase.

Figure 3A:
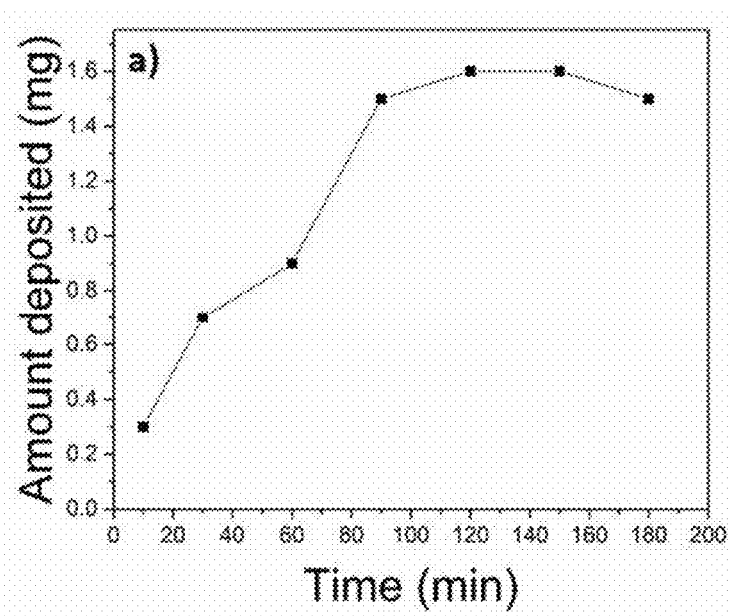
FIG. 3a is a graph of the amount of Pd deposited as a function of reaction time for 1 mL of plating solution on an example substrate with surface area of 130 mm$^2$.

For a better understanding of deposition kinetics, chemical reaction rates were examined during the plating process. Several plating runs were performed to observe the rate of Pd deposition over time and the change in the deposition rate over time. Due to the high affinity observed by PC towards metallization, it was selected as the substrate for this study. To determine the mass of Pd plated, filaments of approximately the same length were weighed before and after the deposition process. FIG. 3A shows the amount of Pd deposited as a function of reaction time for 1 mL of plating solution on a plastic filament with an approximate surface area of 130 mm$^2$, corresponding to an average film thickness of 1 µm when the reaction is complete. The graph shows an initial linear increase in the amount of Pd deposited as reaction time is increased and eventually reaches a plateau as reactants are depleted. Although it may be possible to replenish the reaction by adding additional Pd precursor, for small scale batches it is generally better to use freshly prepared solution as a small amount of metal does tend form in solution, creating competing surfaces for reactions to occur, leading to an increasingly lower yield over time.

Figure 3B:
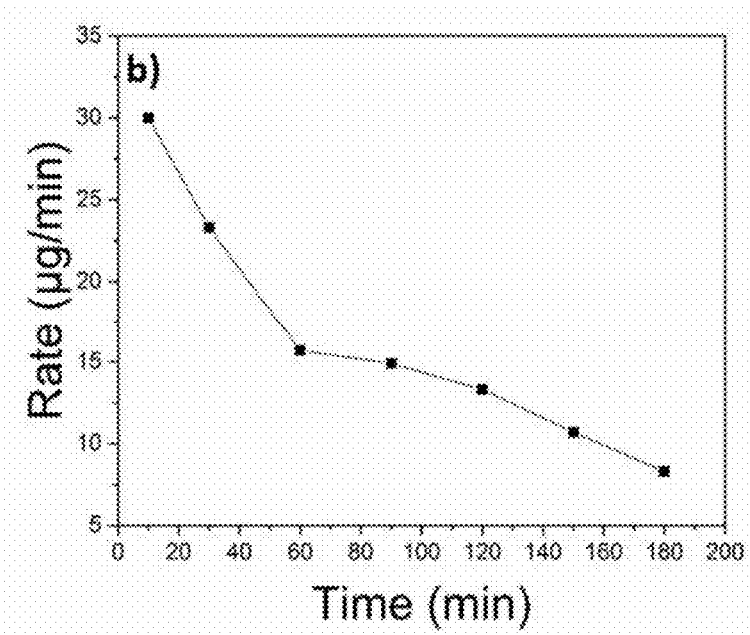
FIG. 3b is a graph of a reaction rate of an example plating process as a function of time on an example substrate with surface area of 130 mm$^2$.

For a standard 1 mL plating bath, a maximum of 1.5-1.6 mg of Pd was deposited on the substrate. Under these reaction conditions, it took approximately 90 minutes to reach maximum deposition mass before the reaction stalled. Since hydrazine was added in excess, the reaction plateau was likely the result of Pd ions being depleted from the reaction solution. A maximum of 15 µmol of Pd was plated out of a total of 18 µmol present in a 1 mL solution. This yielded an approximate conversion efficiency of 83% for Pd$^{+2}$. Reaction rates also showed a gradual decrease over time. (FIG. 3b). The deposition rate started at a maximum and gradually decayed over time.

Example 5: 3D Printed Lattices

In Example 5, to determine whether the electroless deposition process is directly transferable to more complex substrate geometries, cylindrical PC parts containing logpile lattices were printed using an FDM printer. Mesh lattices were printed with a Stratasys Fortus 360mc using a standard polycarbonate filament.

Substrate lattice structures had pore and filament widths of 250 µm. The mesh lattices were approximately 50% volume fraction and were made by extruding parallel lines with gaps, each about 250 µm in width, in a given layer, but rotating lines in each layer by 90 degrees versus the layer below. This created pores of square cross section, 250 µm on a side, that passed through the part in the line directions and the direction perpendicular to the layers. The printer was not very precise on this length scale, so there was significant variation in dimensions within the part. On the sides of the cylinder, the extruder made U-turns, which occluded some of the pores. Cylinders were 19 mm in diameter with a thickness of 5 mm and designed to fit tightly into a PD-10 column.

Example 6 Plating of Example 5 with Aqueous Solution

In Example 6 plating attempts were made with aqueous solutions containing the plating reagents with no cosolvent. These did not penetrate far into the lattice. It is believed that this was due to the hydrophobicity of the PC polymer. In the experiments with filaments described above in Examples 1-4, hydrophobic effects remained relatively negligible during the plating process as substrates were composed of simple geometries with purely macroscale features. For the lattice-containing cylinders, hydrophobic effects were strong enough to prevent fluid flow through the micron scale substrate channels, limiting the ability of reactants to reach the internal structure of the substrate. Cross-sections of substrates during initial plating attempts showed little internal metallization within the structure and none at the center.

Example 7: Plating of Example 5 Structures with Aqueous/Alcohol Solutions

In Example 7, to improve wetting on the substrate surface, reactant solutions were prepared not with just DI water but a mixture of DI water and varying volume fractions of isopropanol as a cosolvent to improve wetting into substrate pores. Isopropanol was selected as it is relatively compatible with PC (as compared to other organic solvents), exhibits no strong reactivity with reagents used in the initial plating phases, and does not affect the solubility of the reagents at the concentrations used. Surface wetting was assessed by placing a single drop of solutions on the surface of the substrate where the drops contained increasing volume fractions of cosolvent until the drop descended into the part. From this experiment, the lower limit for full wetting of PC was established at 20% isopropanol. It should be noted however, that soaking PC in solutions containing isopropanol for periods greater than 24 hours tended degrade substrates, causing them to become brittle. For short exposure times, however, there were no observable signs of degradation. When extending this procedure to other materials, it is recommended to test the desired substrate with the cosolvent to ensure compatibility before implementing it in the plating process.

After testing for the appropriate alcohol content, the plating procedure followed a similar four step process as described for Examples 1-4 with slight modifications. In place of pure DI water, Na$_2$PdCl$_4$ and NaBH$_4$ solutions were prepared with 20 wt % isopropanol (IPA). Substrates soaking in the Na$_2$PdCl$_4$ solution were placed on an orbital shaker for 30 minutes and then transferred to a solution of NaBH$_4$ for another 30 minutes. Afterward, the substrate was removed and placed on a paper towel (Kimwipe) to wick away excess solution. The substrate was then transferred to a solution of NaBH$_4$ with 20 wt % IPA for another 30 minutes. Once the substrate was removed from the NaBH$_4$, excess solution was again wicked away. The plating procedure was performed as disclosed in Examples 1-4.

Upon cross-sectional examination, it was revealed that only partial metallization within the substrate occurred. The metallization did not penetrate to the center of the PC lattice substrate. This result suggested that transport of reagents into the pores also limits deposition onto interior surfaces of a dense lattice. Since the time to diffuse across a pore radius is relatively small compared to the time to diffuse over the length of the pore, ions are likely being reduced at the substrate surface faster than they can diffuse into the substrate lattice. The greater deposition rate at the surface can also potentially cause metal to form over the pores, or otherwise constrict their entrances, further limiting diffusion of reactants into the substrate (though film thickness was much smaller than pore width in these experiments).

Example 8: Plating of Example 5 Structures with Pressure Assistance

The process of Example 7 was repeated, however, in a step to enhance the mass flow of reactants into the center of lattice, after the soaking in the DI water and alcohol solution and other reactant as stated above, the substrate was transferred to a PD-10 column (GE Healthcare) and connected to a syringe pump, and 5 mL of plating solution was added to the column. See FIG. 1 for a diagram of this apparatus. The syringe pump was programmed to withdraw and inject the plating bath solution at 2 mL/min and run in a continuous loop for 24 hours. After 24 hours, the example substrates were removed from the column, washed with DI water, and left to air dry.

Figure 4A:
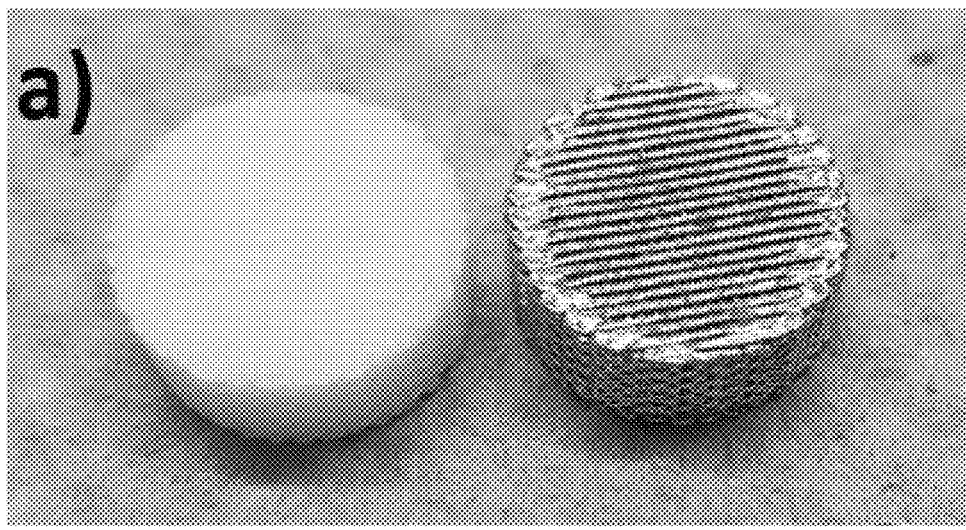
FIG. 4a is a photograph showing an unplated example of a 3D printed lattice structure and a plated example 3D printed lattice structure.
Figure 4B:
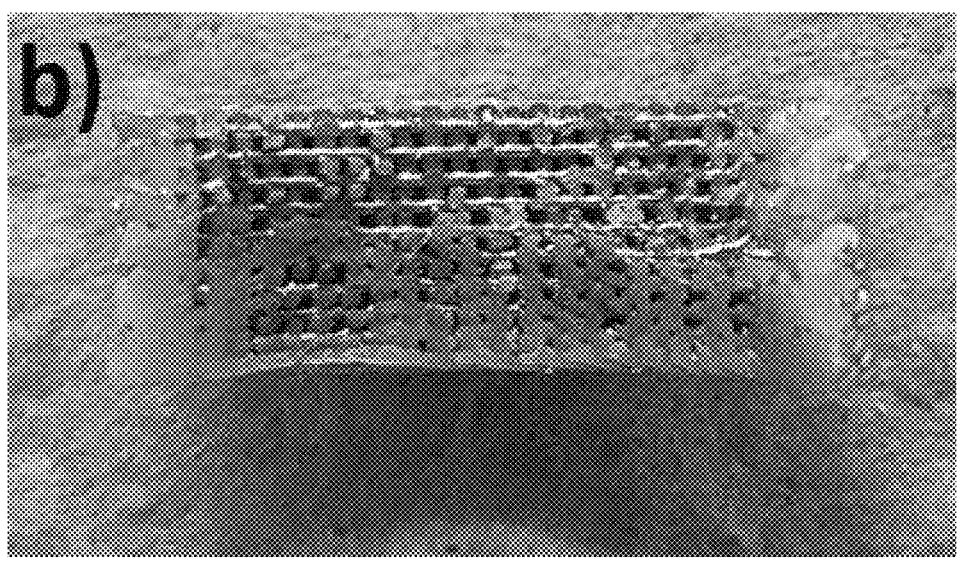
FIG. 4b shows a cross-section of a plated example of a 3D printed lattice structure.

After implementing the pumping procedure, substrates exhibited successful external (FIG. 4a) and internal (FIG. 4b) metallization. It was found that isopropanol was not necessary in the final plating step as the pressure driven flow was sufficient in this embodiment to cause liquid to enter the pores. FIG. 1a shows an unplated PC logpile lattice structure according to Example 5 and FIG. 4b shows a cross-section of a plated PC logpile according to Example 8.

Examples 9 and 10: Electroless Deposition on 3D Printed Photopolymers Through Stereolithography Stereolithography based 3D printing was conducted by projecting an image into a resin bath, polymerizing one layer of the part at a time. This allows for smaller and more precise microscale geometries than those typically achievable on an FDM printer. In contrast to thermoplastics such as ABS or PC, photopolymer resins are often composed of multiple chemical components with various functions. The resin used here consisted of acrylates, a photoinitiator, and a UV blocker. In Examples 9 and 10, cubes containing logpile lattices and cylinders containing cubic lattices were printed on an Autodesk Ember 3D printer using PR-48 clear resin and PR-57K black resin.

In Example 9, to determine how photopolymer parts respond to the plating process described here, a 5 mm cube containing a logpile lattice with 200 µm lines and gaps was printed using clear resin (PR-48) as an initial test substrate.

The plating procedure was similar to that previously outlined for Example 7. In this case, pure isopropanol was used in place of an isopropanol-water mixture for the $Na_2PdCl_4$ soak. Specifically, the initial $Na_2PdCl_4$ solution was prepared by adding 500 µL of 0.25 M $Na_2PdCl_4$ to a solution of 5 mL of isopropanol with moderate stirring for 30 minutes. The photopolymer substrate was transferred to 5 mL of 0.1 M aqueous $NaBH_4$ and 2 mL IPA for 30 minutes and then directly transferred to a vial containing 5 mL of the plating solution. The substrate was plated for 1 hour under moderate stirring. Best results were achieved when the photopolymer substrates were transferred directly between solutions without an intermediate wicking step. After plating, the substrate was washed with DI water and air dried.

Pure isopropanol was used for the post-print cleaning step to remove residual liquid resin from the pores of printed parts, and caused no observable degradation to parts as seen in those printed from PC. This may be due to the fact that the solid photopolymer is crosslinked. The ability to use pure isopropanol during the initial seeding phases also helps reduce any hydrophobic effects exhibited by the polymer surface and helps improve transport of reactants through the internal lattice structure. Prolonged soaking in isopropanol was observed to cause mild swelling in parts. However, swelling gradually receded as substrates were dried, with no significant changes to polymer characteristics.

Figure 4C:
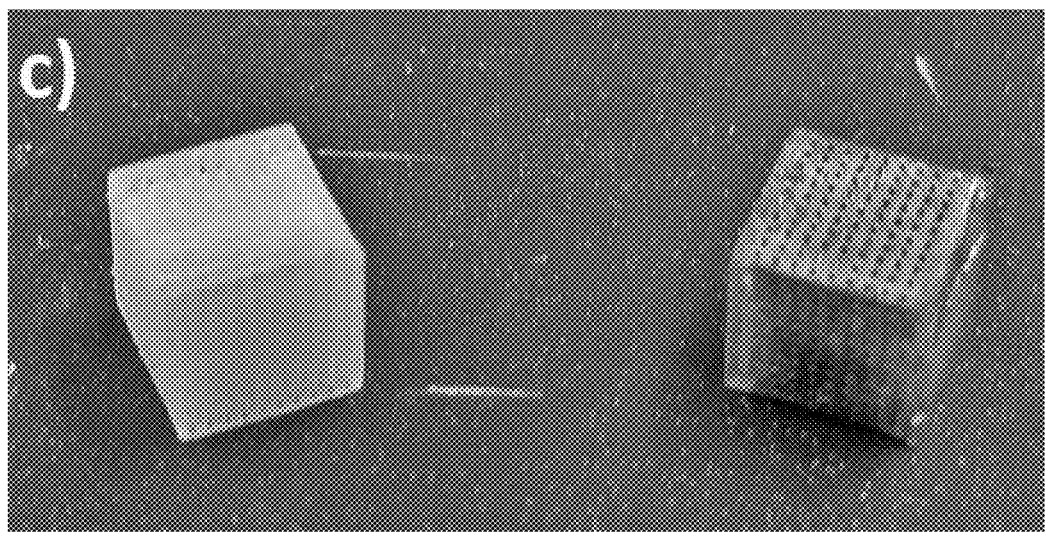
FIG. 4c is a photograph showing an unplated example of a photopolymer 3D printed cubic lattice structure and a plated example of a photopolymer 3D printed cubic lattice structure.

FIG. 4c shows a photopolymer cube before and after plating. Plating rate, film brightness, and adhesion strength for photopolymers were comparable to those observed for PC substrates. Additionally, only moderate stirring was needed to achieve full internal metallization, eliminating the need for more complex pressure driven flow systems used in the PC formed Example 8 substrate.

In Example 10, a 2 mm diameter, 20 mm long cylinder was printed using black resin (PR-57K). The structure had a cubic lattice with 150 µm pores. The lattice within the part consisted of a tiled cubic unit cell with three struts that extended from one corner along the three adjacent edges. The struts had a square cross section, and were half the width of the unit cell, which was 300 µm. Upon tiling, a lattice was formed that is similar to but more symmetric than the logpile, and had 150 µm pores. The tiling was such that the cube space diagonal was aligned with the cylinder axis. The plating procedure used was identical to that used for the 5 mm cubes in Example 9.

Figure 4D:
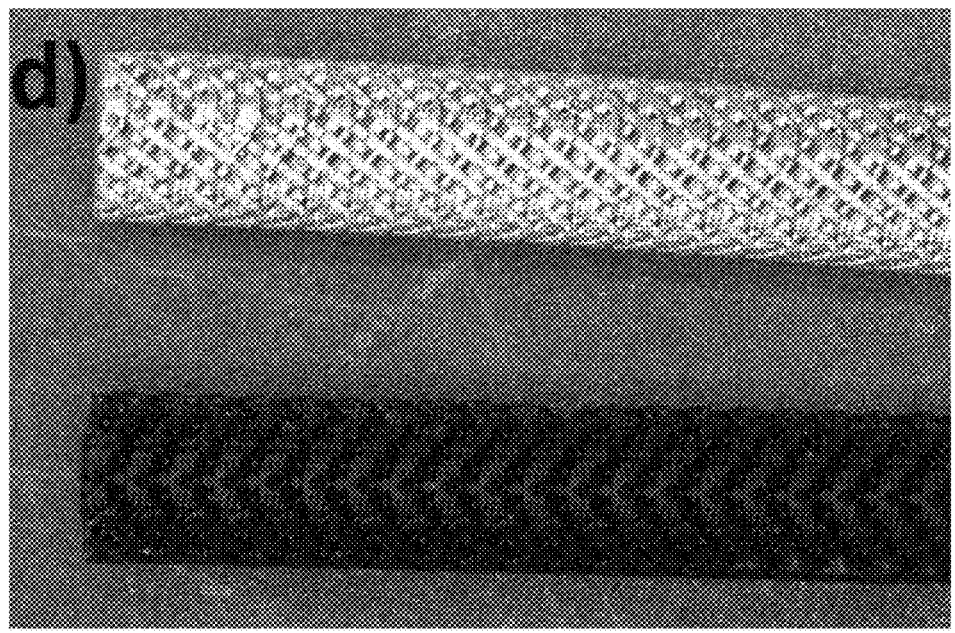
FIG. 4d is a photograph showing an unplated example of a photopolymer 3D printed cylindrical lattice structure and a plated example photopolymer 3D printed cylindrical lattice structure.

Full metallization of both external and internal lattice structures was achieved using the standard plating procedure and moderate stirring. FIG. 4d shows exterior views of plated and unplated parts.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A process for metallizing a three-dimensional-printed polymeric structure comprising:
    soaking the three-dimensional-printed polymeric structure in a metal salt solution;
    transferring the three-dimensional polymeric structure to a solution comprising a first reducing agent;
    soaking the three-dimensional polymeric structure in a metal plating bath, the metal plating bath comprising a coordinating agent, a palladium or platinum salt, a pH buffer component, and a second reducing agent, to form a metal plated polymeric structure;
    wherein the polymeric structure comprises a polymer selected from the group consisting of: polycarbonate, acrylonitrile butadiene styrene copolymer, acrylonitrile-styrene-acrylate copolymer, and poly(methyl methacrylate).

2. The process of claim 1, wherein the first reducing agent is a borohydride with an alkali or alkaline earth metal compound.

3. The process of claim 1, wherein the pH buffer comprises ammonia and ammonium chloride.

4. The process of claim 1, wherein the second reducing agent comprises hydrazine.

5. The process of claim 1, wherein the coordinating agent includes ammonia, the pH buffer includes ammonia and ammonium chloride, and the second reducing agent includes hydrazine.

6. The process of claim 1, wherein the second reducing agent reduces the palladium or platinum at a lower rate than the first reducing agent.

7. The process of claim 1, further comprising the step of three dimensional printing the three-dimensional-printed polymeric structure, wherein the printing step is performed by an automatic extruding process.

8. The process of claim 1, wherein the polymeric structure consists of a polymer selected from the group consisting of: polycarbonate, acrylonitrile butadiene styrene copolymer, acrylonitrile-styrene-acrylate copolymer, and poly(methyl methacrylate).

9. The process of claim 1, wherein the first soaking step oxidizes the surface of the three-dimensional polymeric structure.

10. The process of claim 1, wherein the metal of the metal salt is selected from palladium, platinum, nickel, copper, gold, silver, and rhodium, or combinations of any of these.

11. The process of claim 1, wherein nanoparticles of the metal of the metal salt are formed on a surface of the three-dimensional polymeric structure.

12. The process of claim 1, wherein the metal salt solution includes water and a water-soluble organic cosolvent.

13. The process of claim 12, wherein the plating solution comprises a water-soluble, polar organic solvent.

14. The process of claim 1, wherein the further comprising applying pressure or vacuum to force the metal salt solution into contact with the three-dimensional polymeric structure.

15. The process of claim 14, wherein the three-dimensional polymeric structure includes at least a portion of a lattice with pore sizes of 5 micrometers to 1000 micrometers.

16. The process of claim 15, wherein, following the metal plating bath step, at least 98% of the three-dimensional polymeric structure is covered with metal.

* * * * *